(No Model.) 2 Sheets—Sheet 1.

J. G. BRIGGS.
COOKING AND CANNING APPARATUS.

No. 321,480. Patented July 7, 1885.

(No Model.) 2 Sheets—Sheet 2.

J. G. BRIGGS.
COOKING AND CANNING APPARATUS.

No. 321,480. Patented July 7, 1885.

WITNESSES
Wilmer Bradford
M. B. Woodworth

INVENTOR
John G. Briggs
By C. W. M. Smith
Attorney

UNITED STATES PATENT OFFICE.

JOHN G. BRIGGS, OF SAN JOSÉ, CALIFORNIA.

COOKING AND CANNING APPARATUS.

SPECIFICATION forming part of Letters Patent No. 321,480, dated July 7, 1885.

Application filed November 28, 1884. (No model.)

*To all whom it may concern:*

Be it known that I, JOHN G. BRIGGS, a citizen of the United States, residing at San José, in the county of Santa Clara and State of California, have invented a certain new and useful Cooking and Canning Apparatus, of which the following is a specification.

The objects of my invention are to provide a means whereby fruits, vegetables, &c., can be rapidly cooked and canned in glass with a less percentage of loss by the cracking or breaking of the glass than by other devices heretofore employed. I accomplish these objects by the means illustrated in the accompanying drawings, in which—

Figure 1:
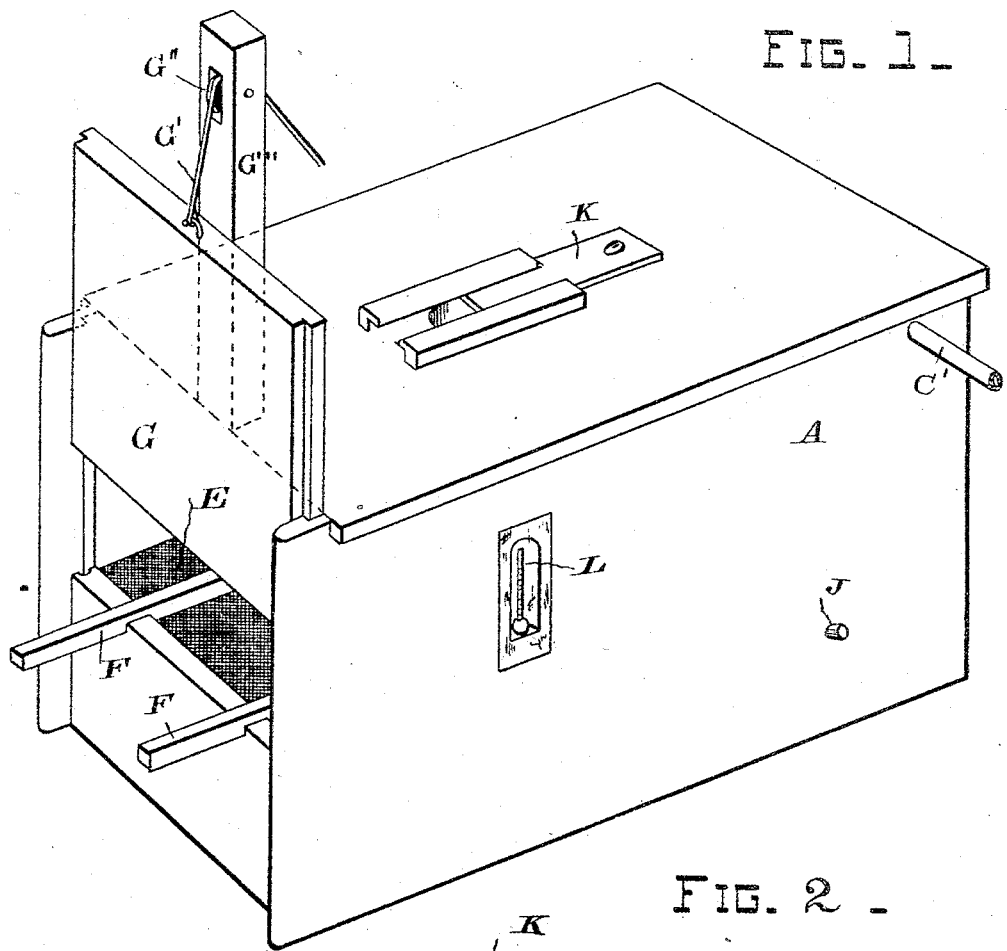
Figure 2:
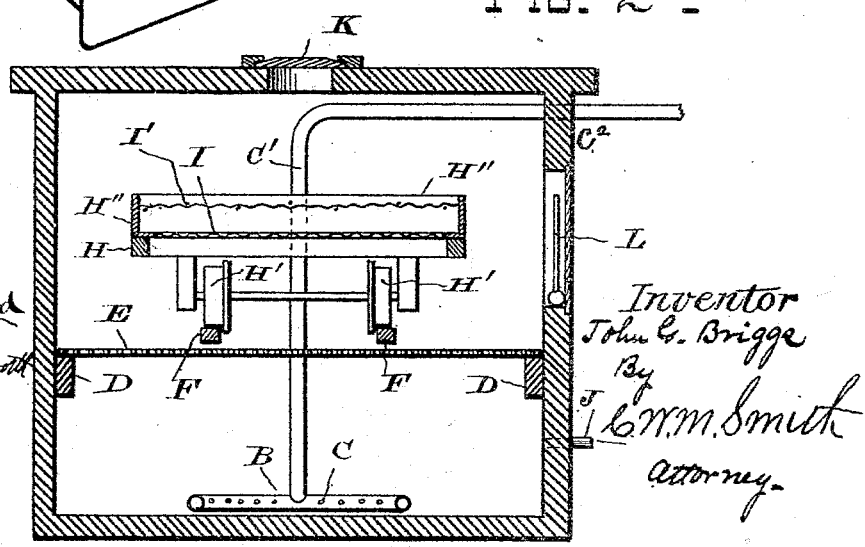
Figure 3:
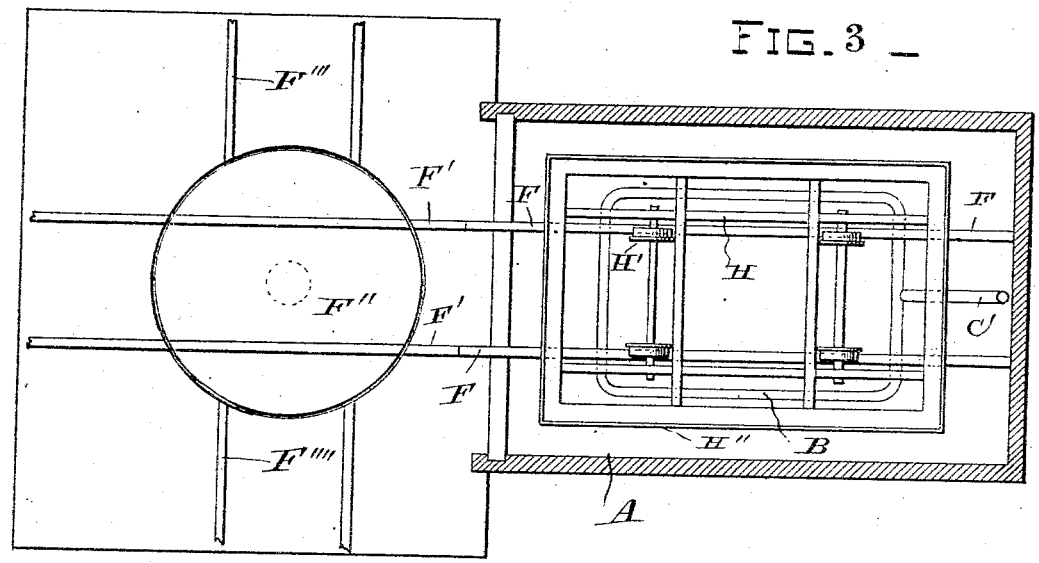
Figure 4:
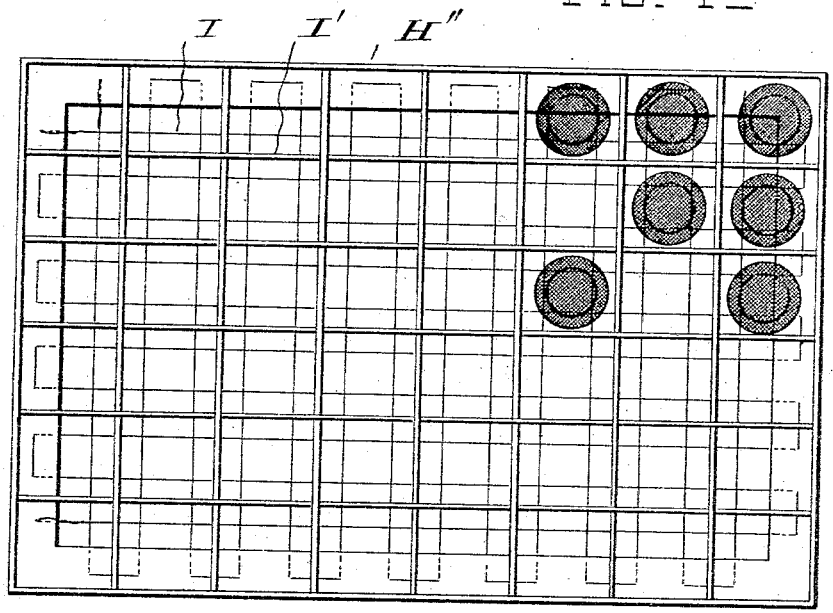

Figure 1 is a perspective view of my improved means for cooking and canning. Fig. 2 is a cross-section of the same. Fig. 3 is a plan of a track and turn-table employed for transporting a can-containing car or cars to the apparatus and throughout the apartment in which the apparatus is located. Fig. 4 is a plan view of the can-receiving portion of the car or carriage, showing a few of the cans in position.

Similar letters of reference are used to designate like parts throughout the several views.

The cooking-apartment A is rectangular in form, and is made steam and water tight. Within the bottom of this apartment is a rectangular line of pipe, B, coupled together and laid flatwise on the bottom of the apartment, and provided with an interior line of perforations or holes, C. From the inner end of this rectangular-laid pipe is connected a branch pipe, C', which extends upward and passes out through the apartment at C², and may be provided with a cock or valve to shut off or turn on steam, water, or hot air. The interior of the apartment is provided with inwardly-projecting cleats D D, upon which is placed a perforated screen, E, which extends from end to end of the apartment. The object of this perforated screen is to evenly distribute the steam in passing up into the cooking-compartment, and also to prevent the water, should ebullition take place in the tank below, from entering the compartment above. A railroad-track, F, extends from end to end of the cooking-apartment, passing over the screen E, and is supported by the ends of the said apartment or apparatus, and a sliding gate, G, shuts down in comparatively steam and water tight ways at the front end of the apartment over the ends of the track. This gate is operated by a cord and pulley, G' G", within or upon a standard, G'''.

For the further carrying out of my invention I construct a peculiar car bottom or platform to contain and transport the cans or jars of fruit, vegetables, &c., to be cooked and canned. It consists of a frame-work, H, supported by the wheels H', and around the sides and ends of the frame-work is placed a frame or border, H", made of thin metal and bent at right angles, and bolted to the side and end supports of the frame. From these angle irons or flanges are woven wires I, which cross each other from side to side and end to end, forming open meshes of sufficient space to sustain the bottom of the can without obstructing the heated air or steam from beneath, while to the vertical sides of the plate are connected wires I', which cross each other and form open spaces, to receive and support the cans and prevent them from coming in contact with each other while cooking or in transportation. A track, F', connects with the track F, which in turn connects with a turn-table, F'', and this turn-table connects with side tracks, F''' F'''', so that the can-containing car or cars can be shunted, switched, or directed to different parts of the building in which the operation of canning is being carried on. These tracks or rails and the frame-work of the car may be constructed of wood and be light and noiseless.

In practice cold water is introduced to the chamber in the bottom of the apparatus to a short distance below the overflow-pipe J. The bottles, cans, or jars are filled at the place of packing in the building, and placed within the wire meshes or openings on the top of the car, with the bottom of the cans resting upon the wire grating beneath, with the covers of the cans removed, when the car is conveyed to the apparatus along the track or rails and the door closed down, when steam is admitted to the water through the medium of the perforated pipes or coils in the bottom, and gradually heats up the water, and with it the contents of the cans upon the car, the heat increasing in intensity until the contents of the cans are sufficiently cooked to be removed, which will usually occupy the space of fifteen or twenty minutes. Should the heat become too intense, however, a slide, K, is placed upon the top of the apparatus, which covers an opening in the roof, and when drawn back permits the surplus heat to pass off.

The temperature of the cooking-apartment is indicated and regulated by a thermometer, L, placed in the side of the apparatus, as shown.

It will here be observed that if a surplus of water should accumulate in the tank in the bottom of the apparatus from the steam admitted through the perforated pipes, it will pass off through the overflow-pipe J, so that the water can always be kept at a certain height in the tank. Thus it will be seen that car after car of canned materials can be treated and switched off while the jars or cans, if of glass, are gradually heated, and less liable to break or crack than where sudden or accumulated heat is applied—such, for instance, as placing the jars or cans in a recently-heated apartment or hot water—as the steam can be turned off in my apparatus and the apartment tempered while removing each succeeding car of filled and cooked cans.

Having thus described my invention, what I claim, and desire to secure by Letters Patent, is—

1. In a canning and cooking apparatus, the car H, having sides H'', wire-mesh floor I, and can-retaining wires I' I', substantially as and for the purpose described.

2. In an apparatus for cooking and canning fruit, the combination, with a steam-heated apartment having a railway-track, of a car provided with a wire-mesh floor and can-retaining wires, substantially as described.

In testimony that I claim the foregoing I have hereunto set my hand and seal.

JOHN G. BRIGGS. [L. S.]

Witnesses:
C. W. M. SMITH,
WILMER BRADFORD.